July 20, 1926.

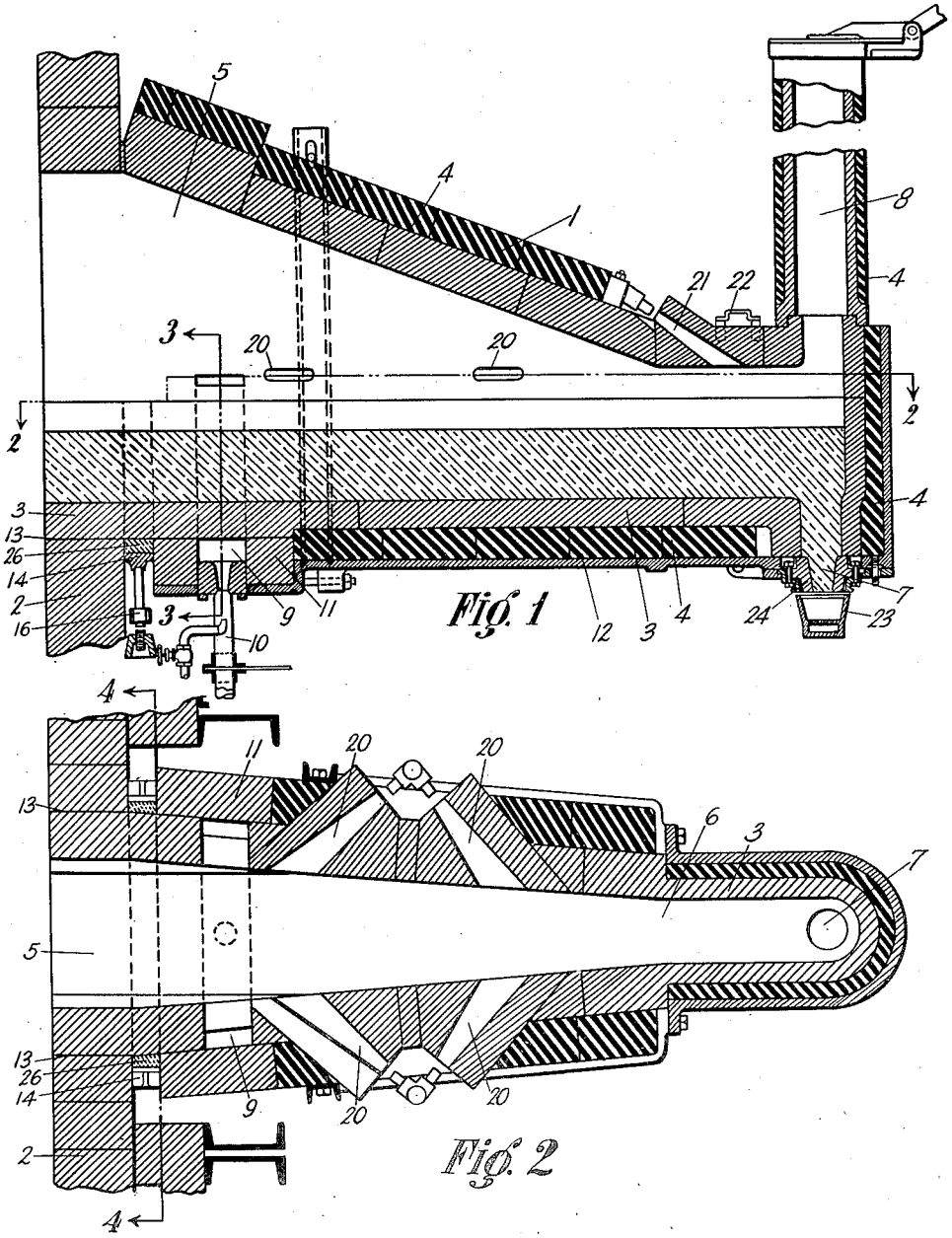

E. P. CORBETT 1,593,290

APPARATUS FOR DELIVERING VISCOUS GLASS

Filed Nov. 15, 1924    2 Sheets-Sheet 2

INVENTOR.

BY

ATTORNEYS.

Patented July 20, 1926.

1,593,290

UNITED STATES PATENT OFFICE.

EDWIN P. CORBETT, OF COLUMBUS, OHIO, ASSIGNOR TO HARTFORD-EMPIRE COMPANY, A CORPORATION OF DELAWARE.

APPARATUS FOR DELIVERING VISCOUS GLASS.

Application filed November 15, 1924. Serial No. 750,213.

My invention relates to apparatus for delivering viscous glass. It refers particularly to the delivery of molten glass from a furnace through a spout structure to suitably provided means for separating, in regular succession, uniform masses of the molten glass therefrom, the spout structure being primarily designed to meet certain requirements in the production of en bloc charges preformed as to shape and dimensions and the dropping and settling of such charges right side up in the molds where they are to be further treated.

It may be customary to provide spouts for delivering viscous glass to molds and to provide means for heating the glass in the spouts, but that is not all that is necessary to meet the conditions imposed in the feeding and delivering of en bloc charges of glass. In order to successfully meet the conditions imposed in the formation of en bloc charges, certain accuracies in temperature control and the like, which are obtainable only by special measures of control, are necessary. For instance, glass being delivered through a spout is very liable to develop strata of different temperatures and, if this condition persists in the glass actually being delivered from the delivery orifice of the spout, the charges will frequently curve, because one side is colder than the other, or, otherwise, will be of uneven consistency, or both. These curved charges will not settle properly in their molds, while the uneven consistency will prevent proper subsequent treatment, as by blowing thin, et cetera. These are merely examples of numerous defects due to improper temperature control.

The problem involved in the transfer of viscous glass from furnaces to molds is an intricate one, which, if not kept under accurate control, brings disastrous results. The problem is all the more difficult because of the fact that the internal conditions in the furnace and spout are constantly changing in various degrees in different parts thereof. These ever-changing conditions may be hastened or amplified by lack of control of the temperature conditions of the interior of the spout and furnace and the glass itself. Such changes may be brought about by the application of too much heat, or they may be brought about by the loss of an excessive amount of heat by radiation, et cetera.

One of the objects of my invention is to provide a spout structure having a delivery orifice therein for delivering viscous glass from a furnace to molds, such spout being thoroughly insulated and equipped with sufficient temperature modifying means whereby the temperature of both the interior of the spout and the glass may be efficiently regulated so that, regardless of variations in furnace conditions, charges of viscous glass of chosen quantity, quality, and uniformity may be delivered in uniform succession.

Molten glass is of such a nature that there is a tendency for it to erode and to seep through the joint between the spout blocks and the furnace wall and it may eventually work its way entirely through the clay joint, unless stopped by some means, impairing the effectiveness of the spout temperature controls. Furthermore, the seepage of the glass through the joint between the spout block and the furnace wall may be hastened and amplified due to distortion of the clay joints by the expansion of the clay parts during the heating up of the furnace. Hence, another object of my invention is to prevent seepage of the glass through the clay joints between the spout blocks and the furnace wall where it would prove detrimental to the functioning of my spout apparatus.

Other and further objects of my invention will be apparent as the disclosure progresses and as shown by the accompanying drawings wherein:—

Figure 1 is a longitudinal section of the spout structure shown applied to the furnace.

Figure 2 is a section taken on line 2—2 of Figure 1.

Figure 3:
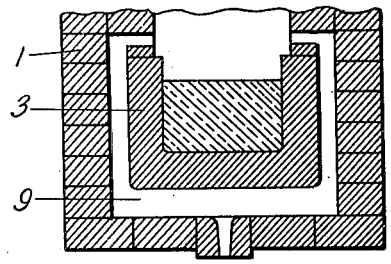
Figure 3 is a partial section taken on line 3—3 of Figure 1.
Figure 4:
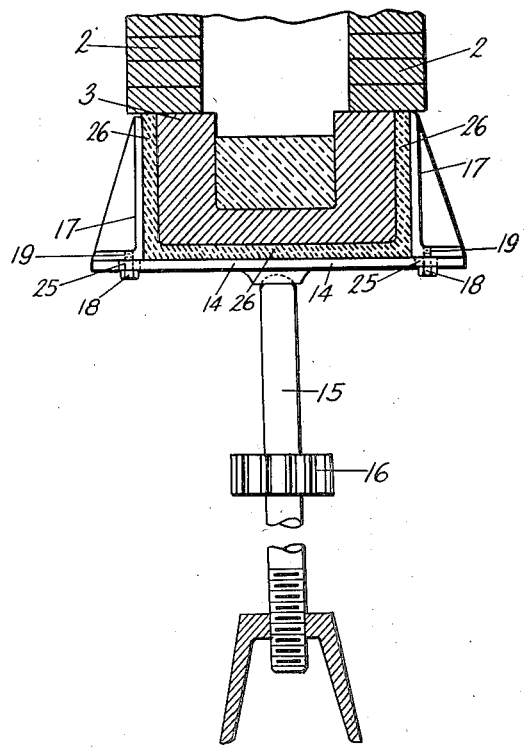
Figure 4 is a partial section taken on line 4—4 of Figure 2.

In order to illustrate and describe my invention, I have chosen the form of spout structure shown in the drawings. Referring particularly to the drawings, it will be seen that I may employ a spout 1 applied to a furnace 2, the spout being provided with top, bottom, side, and end walls. The spout 1 may be formed with channel blocks 3 to form a glass channel through which the molten glass flows. The walls of the spout are thoroughly insulated as at 4. By insulating the spout, the loss of heat from the interior of the spout, the glass therein, and the spout walls by radiation is minimized whereby the temperature modifying means, with which the spout is equipped, as hereinafter described, are rendered efficient to the maximum extent.

The spout 1 is provided with several means, in addition to the insulating lining 4 for controlling the internal temperature of the spout and the temperature of the glass at different points in the spout. Both the channel and the hood of the spout 1 are enlarged at their receiving end as at 5. This facilitates inlet of the glass and the heat currents from the glass furnace. Furthermore, this enlarged portion, forming the wide channel for the glass, results in a slow movement of the glass at this point, which is utilized for temperature regulation before the glass passes into the heavily insulated and narrower channel 6. This result is attained due to the fact that before the glass reaches the delivery orifice 7 in the delivery end of the spout, where it has a more rapid movement, it has ample time for the heated and chilled strata to diffuse and bring about the delivery of charges of any desired uniform temperature and consistency. The spout structure or spout channel, if it is desired, may taper gradually toward the delivery end of the spout, at which point the spout may be provided with a valve controlled chimney 8. This chimney may also be lined with insulating material and assists in drawing the heat currents from the furnace through the spout, thus tending to regulate the temperature of the interior of the spout, the spout walls and the glass therein. By providing such a construction, the glass passes through the spout with a minimum amount of wall friction and the heat currents are readily controlled.

A channel 9 is formed in the walls of the spout and is shown in Figure 3 as extending around three sides of the spout 1 near the juncture of the spout with the furnace 2. This channel 9 may be fed with a heating or cooling fluid from below as at 10. This channel 9 is so shaped as to deliver the temperature modifying fluid into the space 5 above the glass in such a manner that this fluid may mix with the heat currents from the furnace to modify the heat of such currents on the wall surfaces as well as to modify the effect of the wall surfaces upon the glass. It is obvious that the channel 9 may extend through or be caused to extend through the furnace wall at various points therein by the provision of suitable branches to admit the temperature modifying fluid to various locations on the interior of the spout above the glass. However, by delivering this temperature modifying fluid into the spout at the point where the body of glass is moving slowly, its influence may become more effective, in some instances, to bring about the desired result more rapidly.

In referring to the drawings (Figures 1, 2 and 3) it will be seen that in insulating the spout walls, I have, in effect, provided an outer lining for the spout, this lining embodying the insulating material 4, the portion 11 adjacent the channel 9, and the support 12 carrying these portions in place. The portion 12 of the lining may or may not be made of an insulating material. As shown in the drawings, the insulating material 4 may not extend throughout the length of the lining and the channel 9 may be embodied in the manner shown and described; or the channel 9 may be omitted and the insulating material extended throughout the length of the lining.

There is a tendency for the molten glass to erode and seep through the joint 13 between the spout formation and the furnace wall. The molten glass would eventually seep entirely through the joint 13, if not prevented in some manner. Thus, it will be seen that, if the outer lining for the spout were brought up against and flush with the furnace wall and the seepage of the molten glass were not stopped, the molten glass would eventually come in contact with the lining and finally seep through between it and the spout block. If this should occur, with the channel 9 provided, and the outer lining extended flush with the furnace wall, the glass would seep into the channel 9 and eventually render it inoperative. Or, if the channel 9 were omitted and the lining with its insulation 4 were brought up against and flush with the furnace wall, the glass would seep into the insulation and eat part of it away, forming a chemical union with it, thus impairing the insulating qualities of the insulating material, if not actually destroying it.

It is desirable to bring the lining as close to the furnace wall as possible in order to cover the spout channel blocks 3 as fully as possible to reduce loss of heat from the channel blocks to a minimum. However, in bringing the outer lining up to the furnace wall, it becomes highly desirable to prevent the destructive result due to glass seepage as above set forth.

In carrying out my invention, I provide means for taking care of this condition. Regardless whether the channel 9 is used or whether the insulation extends throughout the length of the lining, I positively prevent the seepage of molten glass past the point of juncture of the spout with the furnace wall.

Seepage of the molten glass through clay joints may take place regardless of the close-fitting nature of the clay blocks forming such joint. In most cases, the spout formation may be applied to the glass furnace before the heating-up of the furnace takes place and while the clay parts are cool. In applying the spout formation in this manner, it is obvious that the spout may be made to fit closely to the furnace wall providing a comparatively tight joint at the juncture point. However, when the glass furnace is heated the clay parts with which the heat contacts expand to varying degrees which may result in distorting the clay joints and the destruction of their close-fitting nature. This distortion may take place to a certain extent at a point adjacent the joint between the spout and the furnace and, as a result, the seepage of the molten glass through the joint is hastened and amplified.

In providing against seepage, I utilize a soft and plastic material, preferably a clay material such as a mending clay of practically neutral expansion and contraction characteristics. I preferably apply this plastic material after the heating-up of the furnace has been accomplished. The seepage of the glass is likely to occur across the bottom of the spout and upward along its sides to a distance equal, at least, to the level of the glass in the spout. In applying the outer lining to the spout in accordance with my invention, it is spaced to a slight degree from the furnace wall across the bottom of the spout and upward along the sides of the spout to a slight distance above the level of the glass therein. In this small space between the outer lining and the furnace wall, I interpose a layer of the soft and plastic material, as at 26, such layer being wide enough to cover the space and of any desired thickness to suit the particular operating requirements. While this material, such as mending clay or the like, is soft and plastic, I adjust a bracket 14 in place against the clay in the space between the lining and the furance wall. If found more desirable, the clay may first be placed on the bracket 14 and the whole unit then fixed in place in the said space. The bracket 14 is carried and supported by an adjustable base 15. When the clay, or other suitable plastic material, the bracket 14, and the base 15 are fixed in place, a spanner wrench or other suitable device is applied to the adjusting device 16 on the base 15 to move such adjusting device to provide a jack-like action whereby the bracket 14 is forced upwardly toward the spout 1. By this construction and application, the soft plastic material is forced up into the joint 13 between furnace wall and spout 1 or, at least its outer portion, sealing that joint positively. The plastic clay is also forced up into the adjacent joint between the outer lining and the spout, also forming a positive seal at that point. Still further, the plastic clay is applied with sufficient pressure to force it into the pores of the porous clay material forming the spout so that a positive glass-tight and air-tight joint is formed across the space between furnace wall and outer lining. This positively prevents seepage of the glass through the joint 13 and into contact with the outer lining of the spout. By my method, the end of the outer lining can be brought up in very close proximity to the furnace wall without danger of injury to the outer lining, et cetera, due to glass seepage. Still further, by the above application and construction, the spout is covered and, in fact, insulated throughout its entire length, thus assisting greatly in the maintenance of a constant temperature condition in the spout and, at least, lessening the effect of the obstacles ordinarily presenting themselves in such maintenance.

The bracket 14 is of such construction that it may be left in place between the furnace wall and outer lining to hold the originally soft clay in place after it has become dry due to heat, if such a thing is necessary. By this arrangement, the same effect is produced as if the spout lining extended flush with the furnace wall but without the hereinafter stated detrimental results.

Attention is called to the fact that the bracket 14 is constructed in sections so that it may be readily adjusted to the spout to get the most effective results. The side arms 17 of this bracket are removably and adjustably carried upon the base which is provided with suitable adjusting slots 25. By loosening the nuts 18 on the bolts 19, these arms 17 can be moved along their support to adjust them to the conditions of use. This adjustment may be very useful in case the thickness of the layer of soft clay should vary when applied at different times; or in case the bracket may be used on a spout of different dimensions or when the dimensions of the space may vary.

In addition to the above, the spout may be provided with the obliquely arranged ports 20 in its walls which are so located as to make possible the direct application of heating or cooling blasts to any area above the surface of the glass in the spout. I may also provide a port 21 in the top of a lid 22 of the spout nose, this port permitting the application of either a heating or cooling blast within such nose and adjacent the delivery orifice. This lid is particularly desirable because it is removable to give ready access to the glass in the spout.

With the construction hereinbefore described, the temperature of the glass and spout walls at every point is under positive control and this control is so complete throughout the entire length of the spout that the glass may be brought to the delivery orifice at any desired uniform consistency and at any rate of movement within chosen limits.

In order to have full and complete control of the temperature of the glass practically up until the time it is delivered to the mold, I may employ a means for intermittently stopping the feed of glass from the delivery orifice of the spout. This means may take the form of a combustion cup 23 which is movable into and out of closing relation to the bottom end of the spout orifice. When this cup 23 is in capping position relative to the orifice, gas under pressure is fed to it and is burned therein so that an intense heat is applied to the clay bushing 24 and the glass in the spout orifice. This makes complete a positive temperature control of the glass and the spout which conducts the glass from the time that the glass leaves the furnace until it is delivered from the spout to the mold.

Having thus described my invention, what I claim is:—

1. A spout for delivering viscous glass from a furnace comprising a body portion with a delivery aperture therein, an outer lining for said body portion, and a layer of plastic material interposed between said outer lining and the furnace.

2. A spout for delivering viscous glass from a furnace comprising a body portion with a delivery aperture therein, an outer lining for said body portion, said lining being spaced from the furnace, and a plastic member interposed in said space connecting the said outer lining with the furnace.

3. A spout for delivering viscous glass from a furnace comprising a body portion, a covering for said body portion, said covering extending from the furnace practically throughout the length of the spout and embodying an insulating material, and a section of plastic material joining the furnace with said covering.

4. A spout for delivering viscous glass from a furnace comprising a body portion joined to the furnace, an outer lining for said body portion, said lining being spaced from the furnace, and means interposed in said space for sealing the joint between the furnace and the said body portion.

5. A spout for delivering viscous glass from a furnace comprising a body portion having a delivery opening therein, an outer lining for said body portion extending from adjacent the furnace throughout the length of the spout, and a section of plastic material for sealing the joint between the furnace and said lining.

6. A spout for delivering viscous glass from a furnace comprising a body portion having a delivery opening therein, an outer covering for said body portion extending from adjacent the furnace practically throughout the length of the spout, and a section of plastic material interposed between said outer covering and the furnace for sealing the joint between the said body portion and said outer covering.

7. A spout for delivering viscous glass from a furnace comprising a channel block, an outer lining for said block, a channel in said lining adjacent the juncture of said spout with the furnace, said lining being spaced from the furnace, and a layer of plastic material interposed in said space for sealing the joint between the furnace and the spout and joining the said outer lining with the furnace.

8. A spout for delivering viscous glass from a furnace comprising a glass channel formation, an outer covering for said channel formation, said covering being joined with the furnace by a section of plastic material applied so as to seal the joint between the spout and the furnace.

9. A spout for delivering molten glass from a supply reservoir comprising a body portion joined to the supply reservoir, and a section of plastic material for sealing the joint between said body portion and the supply reservoir.

10. The method of preventing seepage of viscous glass between the channel block of a glass delivery spout and the furnace block structure with which it contacts which comprises stopping the crack between these parts with a material that is plastic when applied.

11. A spout for delivering viscous glass from a furnace comprising a channel block which contacts with said furnace and means plastically applied to prevent seepage of glass through the point of contact.

In testimony whereof I hereby affix my signature.

EDWIN P. CORBETT.